US006637082B1

United States Patent
Chang

(10) Patent No.: US 6,637,082 B1
(45) Date of Patent: Oct. 28, 2003

(54) QUICK HOLDER

(76) Inventor: Chun-Yuan Chang, 58, Ma Yuan West St., Taichung (TW)

(*) Notice: Subject to any disclaimer, the term of this patent is extended or adjusted under 35 U.S.C. 154(b) by 0 days.

(21) Appl. No.: 10/261,373

(22) Filed: Sep. 27, 2002

(51) Int. Cl.[7] .............................................. A44B 21/00
(52) U.S. Cl. ........................... 24/523; 24/489; 24/499; 24/516; 24/519; 248/316.3; 248/316.5
(58) Field of Search ......................... 24/523, 517, 520, 24/519, 522, 464, 489, 459, 492, 499, 515, 516; 248/316.3, 316.5, 316.7, 316.4

(56) References Cited

U.S. PATENT DOCUMENTS 3,338,540 A * 8/1967 Barish ...................... 248/316.3
5,535,973 A * 7/1996 Bailey et al. ............. 248/316.5
5,544,396 A * 8/1996 Mekyska ...................... 24/523
5,716,035 A * 2/1998 Nourry et al. ........... 248/316.5
5,867,877 A * 2/1999 Patterson et al. ............. 24/516

* cited by examiner

Primary Examiner—Victor Sakran

(57) ABSTRACT

A quick holder includes a bottom housing, a cover, two clamping members, and a tensile spring. The tensile spring is urged between the retaining posts of the two clamping members conveniently, so that the two opposite clamping members may be used to clamp the paper by a single tensile spring, thereby simplifying the whole structure, and thereby decreasing the difficulty of assembly.

10 Claims, 3 Drawing Sheets

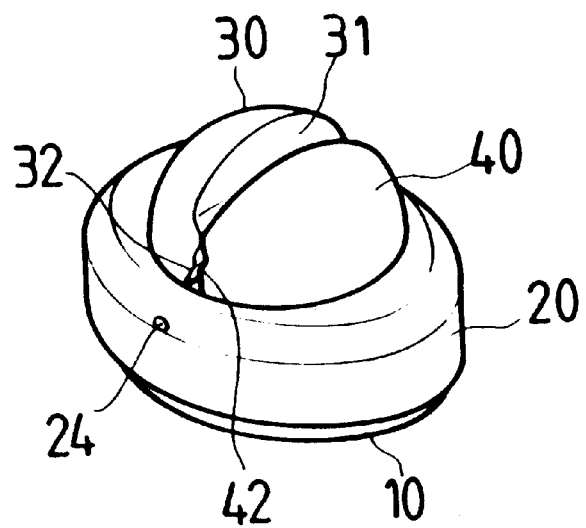
F I G. 2

QUICK HOLDER

BACKGROUND OF THE INVENTION

1. Field of the Invention

The present invention relates to a quick holder, and more particularly to a quick holder that may be assembled quickly, easily and conveniently, and has a simplified construction.

2. Description of the Related Art

A conventional holder in accordance with the prior art of which the applicant is aware is disclosed in U.S. Pat. No. 5,544,396, and is briefly shown in FIG. 1. The conventional holder as shown in FIG. 1 comprises a base 80, two clamping members 82 each pivotally mounted on the base 80, and two springs (not shown) each having a first end secured on an inner wall of the base 80 and a second end secured on a lower end of each of the two clamping members 82. Thus, the paper may be clamped by the two clamping members 82 by the elastic action of the two springs. However, it is necessary to mount each of the two springs between the inner wall of the base 80 and the lower end of each of the two clamping members 82, thereby causing inconvenience and difficulty in assembly. In addition, the two clamping members 82 probably cannot be operated by the two springs in a synchronous manner, thereby affecting operation of the holder.

SUMMARY OF THE INVENTION

The present invention has arisen to mitigate and/or obviate the disadvantage of the conventional holder.

The primary objective of the present invention is to provide a quick holder that may be assembled quickly, easily and conveniently, and has a simplified construction.

Another objective of the present invention is to provide a quick holder, wherein the tensile spring is urged between the two opposite clamping members conveniently, so that the two opposite clamping members may be used to clamp the paper by a single tensile spring, thereby simplifying the whole structure, and thereby decreasing the difficulty of assembly.

In accordance with the present invention, there is provided a quick holder, comprising a bottom housing, a cover, two clamping members, and a tensile spring, wherein:

the cover is mounted on the bottom housing, and has a periphery formed with two radially opposite pin holes for passage of a combination pin;

each of the two clamping members is pivotally mounted on the combination pin, each of the two clamping members has a bottom respectively provided with a pivot ear pivotally mounted on the combination pin, the pivot ear of each of the two clamping members is extended rearward and is provided with a retaining post; and the tensile spring is urged between the retaining posts of the two clamping members.

Further benefits and advantages of the present invention will become apparent after a careful reading of the detailed description with appropriate reference to the accompanying drawings.

BRIEF DESCRIPTION OF THE DRAWINGS

FIG. 2 is a perspective view of a quick holder in accordance with a preferred embodiment of the present invention;

DETAILED DESCRIPTION OF THE INVENTION

Figure 1:
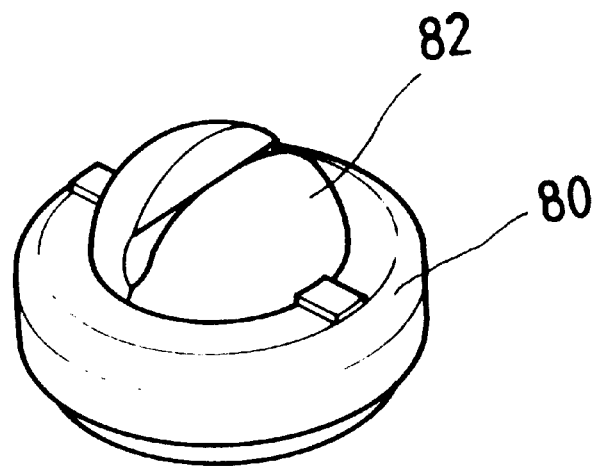
FIG. 1 is a perspective view of a conventional holder in accordance with the prior art.
Figure 3:
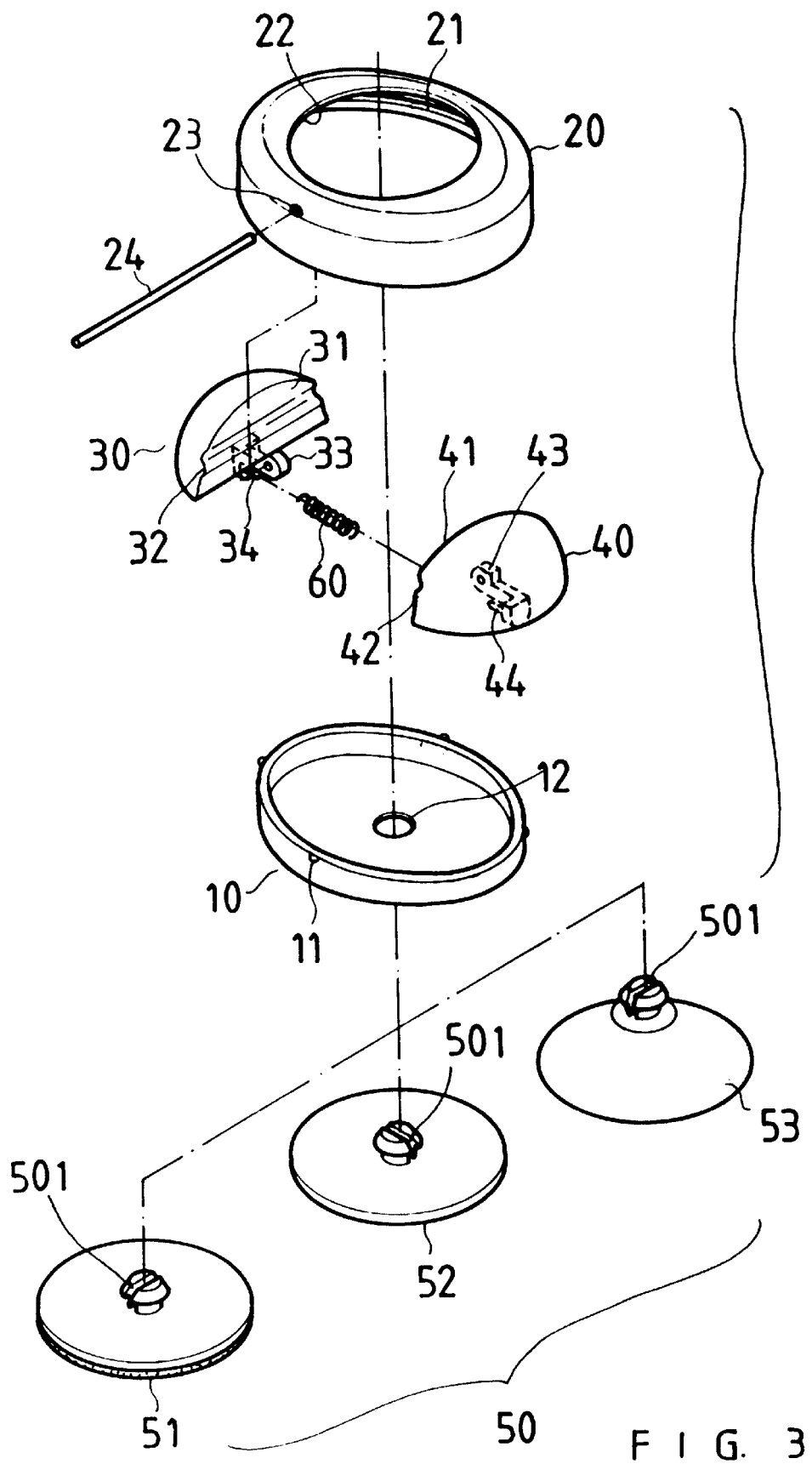
FIG. 3 is an exploded perspective view of the quick holder as shown in FIG. 2.
Figure 4:
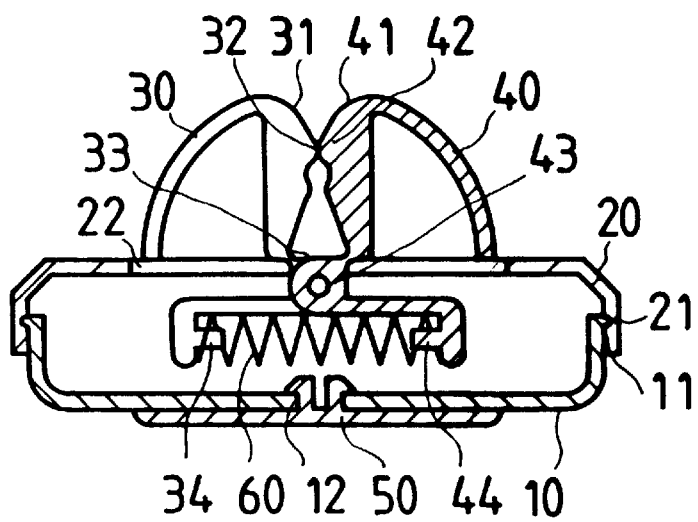
FIG. 4 is a side plan cross-sectional view of the quick holder as shown in FIG. 2.

Referring to the drawings and initially to FIGS. 2–4, a quick holder in accordance with a preferred embodiment of the present invention comprises a bottom housing 10, a cover 20, and two clamping members 30 and 40.

The bottom housing 10 is an oblong or circular disk, and has an outer diameter substantially equal to an inner diameter of the cover 20. The bottom housing 10 has an outer wall provided with a plurality of locking blocks 11, and has a center formed with a through hole 12. The quick holder further comprises a bottom disk 50 provided with a cone-shaped slit insertion head 501 inserted into the through hole 12 of the bottom housing 10, so that the bottom disk 50 is secured on a bottom of the bottom housing 10. Preferably, the bottom disk 50 has a bottom combined with a magnet 51. Alternatively, the bottom disk 50 has a bottom combined with an adhesive plate 52. Alternatively, the bottom disk 50 is made to have a sucker configuration.

The cover 20 is mounted on the bottom housing 10, and has an inner wall formed with a plurality of locking holes 21. Each of the locking blocks 11 of the bottom housing 10 is inserted into a respective one of the locking holes 21 of the cover 20, so that the cover 20 is closely combined with the bottom housing 10. The cover 20 has a top face formed with a circular through hole 22 for passage of the two clamping members 30 and 40. The cover 20 has a periphery formed with two radially opposite pin holes 23 for passage of a combination pin 24.

Each of the two clamping members 30 and 40 is pivotally mounted on the combination pin 24. Each of the two clamping members 30 and 40 has an upper portion provided with an oblique guide face 31 and 41 and a mediate portion provided with a holding rib 32 and 42. Each of the two clamping members 30 and 40 has a bottom respectively provided with a pivot ear 33 and 43 pivotally mounted on the combination pin 24. The pivot ear 33 and 43 of each of the two clamping members 30 and 40 is extended rearward and is provided with a retaining post 34 and 44. The quick holder further comprises a tensile spring 60 urged between the two opposite retaining posts 34 and 44 of the two clamping members 30 and 40.

In assembly, the combination pin 24 is extended through the two radially opposite pin holes 23 of the cover 20, and is extended through the pivot ear 33 and 43 of each of the two clamping members 30 and 40, so that each of the two clamping members 30 and 40 is pivotally mounted on the cover 20. In addition, the tensile spring 60 is urged between the two opposite retaining posts 34 and 44 of the two clamping members 30 and 40 conveniently.

Thus, the quick holder in accordance with the present invention may be assembled quickly, easily and conveniently, and has a simplified construction.

Figure 5:
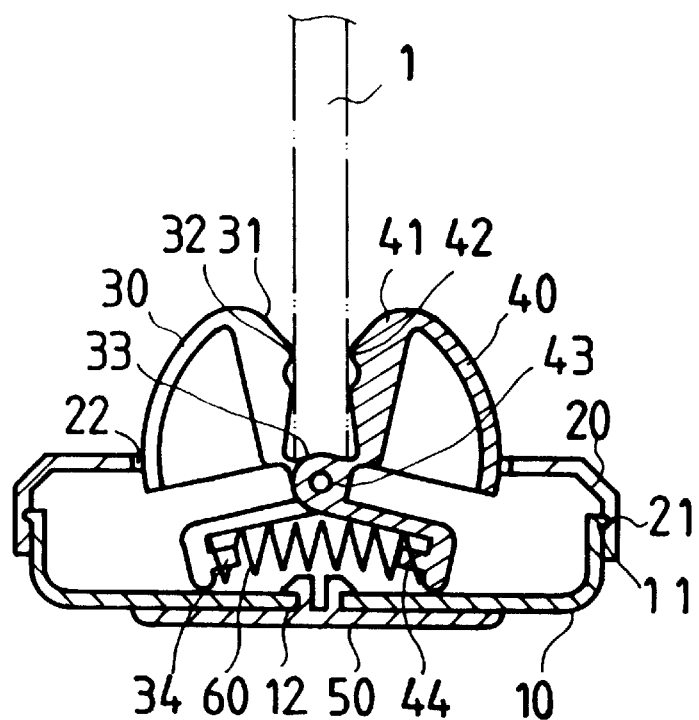
FIG. 5 is a schematic operational view of the quick holder as shown in FIG. 4 in use.

In operation, referring to FIGS. 4 and 5 with reference to FIGS. 2 and 3, the upper portions of the two clamping members 30 and 40 are in contact with each other by the tensile action of the tensile spring 60, so that the holding ribs 32 and 42 of the two clamping members 30 and 40 are in contact with each other as shown in FIG. 4. Then, a sheet of paper 1 may be inserted into the gap between the holding ribs 32 and 42 of the two clamping members 30 and 40 by guidance of the oblique guide faces 31 and 41 of the two clamping members 30 and 40 to press the two clamping members 30 and 40 to move outward and to compress the tensile spring 60, so that the paper 1 may be clamped between the two clamping members 30 and 40. After insertion of the paper 1, the two clamping members 30 and 40 may be pushed to return to the original position by the restoring force of the tensile spring 60, so that the paper 1 may be clamped between the holding ribs 32 and 42 of the two clamping members 30 and 40 as shown in FIG. 5.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A quick holder, comprising a bottom housing, a cover, two clamping members, and a tensile spring, wherein:

the cover is mounted on the bottom housing, and has a periphery formed with two radially opposite pin holes for passage of a combination pin;

each of the two clamping members is pivotally mounted on the combination pin, each of the two clamping members has a bottom respectively provided with a pivot ear pivotally mounted on the combination pin, the pivot ear of each of the two clamping members is extended rearward and is provided with a retaining post; and the tensile spring is urged between the retaining posts of the two clamping members.

2. The quick holder in accordance with claim 1, wherein the bottom housing has an outer diameter substantially equal to an inner diameter of the cover.

3. The quick holder in accordance with claim 1, wherein the bottom housing has a center formed with a through hole, and the quick holder further comprises a bottom disk provided with a cone-shaped slit insertion head inserted into the through hole of the bottom housing, so that the bottom disk is secured on a bottom of the bottom housing.

4. The quick holder in accordance with claim 3, wherein the bottom disk has a bottom combined with a magnet.

5. The quick holder in accordance with claim 3, wherein the bottom disk has a bottom combined with an adhesive plate.

6. The quick holder in accordance with claim 3, wherein the bottom disk is made to have a sucker configuration.

7. The quick holder in accordance with claim 1, wherein the cover has an inner wall formed with a plurality of locking holes, and the bottom housing has an outer wall provided with a plurality of locking blocks each inserted into a respective one of the locking holes of the cover, so that the cover is combined with the bottom housing.

8. The quick holder in accordance with claim 1, wherein the cover has a top face formed with a circular through hole for passage of the two clamping members.

9. The quick holder in accordance with claim 1, wherein each of the two clamping members has an upper portion provided with an oblique guide face.

10. The quick holder in accordance with claim 1, wherein each of the two clamping members has a mediate portion provided with a holding rib.

* * * * *